US008836195B2

(12) United States Patent
Yokochi

(10) Patent No.: US 8,836,195 B2
(45) Date of Patent: Sep. 16, 2014

(54) THREE-PHASE ELECTRIC-MOTOR WINDING WITH DIFFERING TURN NUMBERS FORMING FRACTIONAL EFFECTIVE TURNS

(75) Inventor: Takanori Yokochi, Aichi (JP)

(73) Assignee: Okuma Corporation, Aichi (JP)

( * ) Notice: Subject to any disclaimer, the term of this patent is extended or adjusted under 35 U.S.C. 154(b) by 296 days.

(21) Appl. No.: 13/323,891

(22) Filed: Dec. 13, 2011

(65) Prior Publication Data

US 2012/0175990 A1 Jul. 12, 2012

(30) Foreign Application Priority Data

Dec. 22, 2010 (JP) ................................. 2010-285616

(51) Int. Cl.
*H02K 3/28* (2006.01)
*H02K 3/12* (2006.01)

(52) U.S. Cl.
CPC ...................... *H02K 3/28* (2013.01)
USPC ........... 310/198; 310/184; 310/195; 310/180; 310/179; 318/496; 318/495; 322/90

(58) Field of Classification Search
CPC ....................................................... H02K 3/28
USPC .......................... 310/184, 185, 187, 198, 208
See application file for complete search history.

(56) References Cited

U.S. PATENT DOCUMENTS

| | | | | |
|---|---|---|---|---|
| 3,670,238 A | * | 6/1972 | Ronk | 363/150 |
| 3,949,254 A | * | 4/1976 | Woll et al. | 310/198 |
| 3,979,618 A | * | 9/1976 | Auinger | 310/198 |
| 4,100,444 A | * | 7/1978 | Boyd, Jr. | 310/184 |
| 4,127,787 A | * | 11/1978 | Auinger | 310/184 |
| 4,144,470 A | * | 3/1979 | Auinger | 310/198 |
| 4,284,919 A | * | 8/1981 | Auinger | 310/198 |
| 4,338,534 A | * | 7/1982 | Broadway et al. | 310/184 |
| 4,348,606 A | * | 9/1982 | Hibino | 310/184 |
| 4,371,802 A | * | 2/1983 | Morrill | 310/166 |
| 4,508,989 A | * | 4/1985 | Sawyer et al. | 310/184 |
| 4,528,472 A | * | 7/1985 | Auinger | 310/198 |

(Continued)

FOREIGN PATENT DOCUMENTS

JP 9074702 A 3/1997

OTHER PUBLICATIONS

Machine Translation of Japanese Patent Application JP 09-74702.*
Translation of JP 09074702 A.*

(Continued)

*Primary Examiner* — Quyen Leung
*Assistant Examiner* — Mark R Carter
(74) *Attorney, Agent, or Firm* — Osha Liang LLP

(57) ABSTRACT

A motor is provided. When m is half of a number of slots of one phase and n is a divisor of m, the overall parallel winding of a total number of parallels p is equally divided n-fold into partial parallel windings Ni, having a number of parallels p/n, each partial parallel winding Ni comprises m sub-coils, the m sub-coils including n types of m/n sub-coils having a number of turns tj, at least one of the sub-coils differing in number of turns from the other sub-coils, and, for each pair of the slots in the stator, one sub-coil of each partial parallel winding Ni is wound around the pair of slots, and n sub-coils wound around the pair of the slots include every one of the n types of the sub-coils of the numbers of tj.

3 Claims, 7 Drawing Sheets

(56) References Cited

U.S. PATENT DOCUMENTS

| | | | |
|---|---|---|---|
| 4,710,661 A * | 12/1987 | Gjota | 310/198 |
| 4,751,448 A * | 6/1988 | Auinger | 318/773 |
| 4,806,812 A * | 2/1989 | Masterman | 310/182 |
| 4,868,438 A * | 9/1989 | Okamoto et al. | 310/166 |
| 5,173,651 A * | 12/1992 | Buckley et al. | 318/701 |
| 5,233,280 A * | 8/1993 | Ghosh | 318/800 |
| 5,424,599 A * | 6/1995 | Stroud | 310/198 |
| 5,714,823 A * | 2/1998 | Shervington et al. | 310/184 |
| 5,898,251 A * | 4/1999 | Mochizuki et al. | 310/179 |
| 5,903,080 A * | 5/1999 | Nashiki et al. | 310/168 |
| 6,008,561 A * | 12/1999 | Tang | 310/183 |
| 6,121,706 A * | 9/2000 | Nashiki et al. | 310/168 |
| 6,285,104 B1 * | 9/2001 | Nashiki | 310/184 |
| 6,359,356 B1 * | 3/2002 | Hayashi | 310/90.5 |
| 6,472,790 B2 * | 10/2002 | Rose, Sr. | 310/184 |
| 6,552,463 B2 * | 4/2003 | Oohashi et al. | 310/207 |
| 6,943,477 B1 * | 9/2005 | Nakamura | 310/184 |
| 7,155,805 B2 * | 1/2007 | Nakamura | 29/596 |
| 7,348,705 B2 * | 3/2008 | Cai et al. | 310/184 |
| 7,432,610 B2 * | 10/2008 | Wobben | 290/44 |
| 7,436,097 B2 * | 10/2008 | Wobben | 310/180 |
| 7,478,777 B2 * | 1/2009 | Wobben | 242/433.3 |
| 7,642,667 B2 * | 1/2010 | Wobben | 290/44 |
| 8,283,830 B2 * | 10/2012 | Fujisawa et al. | 310/184 |
| 8,446,121 B1 * | 5/2013 | Parsa et al. | 318/538 |
| 2001/0033116 A1 * | 10/2001 | Rose, Sr. | 310/180 |
| 2004/0245881 A1 * | 12/2004 | Kadoya et al. | 310/185 |
| 2007/0018525 A1 * | 1/2007 | Cai et al. | 310/184 |
| 2009/0267440 A1 * | 10/2009 | Kometani et al. | 310/198 |
| 2010/0181860 A1 * | 7/2010 | Pulnikov | 310/195 |
| 2011/0266912 A1 * | 11/2011 | Smadja | 310/208 |
| 2012/0175990 A1 * | 7/2012 | Yokochi | 310/198 |
| 2013/0015742 A1 * | 1/2013 | Inoue et al. | 310/208 |

OTHER PUBLICATIONS

Patent Abstracts of Japan, Publication No. 09-074702, dated Mar. 18, 1997, 1 page.

* cited by examiner

THREE-PHASE ELECTRIC-MOTOR WINDING WITH DIFFERING TURN NUMBERS FORMING FRACTIONAL EFFECTIVE TURNS

CROSS-REFERENCE TO RELATED APPLICATION

This application claims priority to Japanese Patent Application No. 2010-285616, filed on Dec. 22, 2010, which is incorporated herein by reference in its entirety.

BACKGROUND

1. Technical Field

The present invention relates to a motor, and in particular to a winding structure of a winding in a motor.

2. Background Art

A motor comprises a stator and a rotor. Of these, a winding is wound around the stator, and an electric current is applied to the winding to generate a torque and rotate the rotor. The winding wound around the stator is placed in slots within the stator. The number of windings passing inside the slots is normally set such that a certain number of windings are provided in parallel, and are wound through the same slot for a predetermined number of times. The number of lines to be provided in parallel is called a number of parallels, and the number of times the windings are wound in the same slot for a plurality of times is called a number of turns.

The number of turns will now be described with reference to FIGS. 4 and 5. FIG. 4 is a schematic diagram showing a motor. In FIG. 4, a portion shown with M represents the motor, and three lines which extend from this portion represent three-phase lead lines extending from the motor. A line within the motor M forming a spiral shape represents a winding wound around the motor. Of the three-phase windings, a winding method of the winding between U and X which is a winding of one phase will be described with reference to FIG. 5. FIG. 5 is a schematic diagram showing an example winding method of windings when the number of slots=12 and the number of turns=3. In FIG. 5, the portions represented by S1 and S2 are slots within the motor. C1 and C2 represent coils, of the windings which are wound, which form blocks. As the motor shown in FIG. 5 has 12 slots, the number of slots for one phase is ⅓ of 12, or 4 slots. In addition, because the windings are wound between two slots, the number of coils is 2. In each coil, the same winding is wound in each slot passing for 3 times, and the winding moves to the next slot and the next coil is wound. These processes are repeated so that 3 turns of windings are wound. Similarly, the portion between V and Y and the portion between W and Z are wound, so that the windings of the motor M are wound.

The number of turns is a constant determined by a specification of the motor such as the rotational speed. In general, a voltage generated in a winding in a rotor is known to be proportional to the number of turns of the winding and an amount of change, with respect to time, of a magnetic flux crossing the winding. Because of this, when the current supplied to the motor is constant, the generated torque is increased as the number of turns is increased. Meanwhile, however, when the number of turns is increased, the voltage generated in the winding is also increased. In addition, as the rotational speed is increased, the amount of change of the magnetic flux crossing the winding is also increased in proportion to the rotational speed, and, thus, when the number of turns is increased, the voltage generated in the winding during high rotational speed is increased. If the voltage generated in the winding reaches a power supply voltage of an amplifier connected to the motor, it becomes impossible to supply current from the amplifier to the motor, and the motor cannot be operated. Therefore, the number of turns of the windings is determined such that the motor satisfies the target specification and, at the same time, a desired output can be obtained by applying current within a range where the voltage generated in the winding does not become larger than a predetermined allowable value.

The number of parallels is determined based on the number of turns determined as described above. A total number of windings included in the slot of the stator is the number of turns times the number of parallels. A ratio of the total cross sectional area of the winding over the cross sectional area of the slot is called a lamination factor. Because the slot shape is determined in advance, the lamination factor is limited within a certain value when the windings are inserted into the motor. In the motor, in order to reduce generation of heat, it is desired to minimize the resistance value of the winding, and, consequently, to maximize the thickness of the winding. However, because the lamination factor is limited within a certain value as described above, there is a problem on how the windings are inserted within the determined lamination factor. In this process, the line size of the winding and the number of parallels are adjusted so that the lamination factor is as close to the limitation value as possible. In this manner, the number of turns and the number of parallels of the winding in the motor are determined.

As described, when the winding is designed, the number of turns is determined based on the output which can be achieved by the motor and the magnitude of the voltage generated in the winding. In this configuration, for example, a case may occur where, with 2 turns, the voltage generated in the winding is within the allowable value but the torque that can be generated is small and the specification cannot be satisfied because the number of turns is small, and, with 3 turns, although the specification can be satisfied, the voltage generated in the winding around the maximum rotational speed exceeds the allowable value. In other words, in this example case, if a specification having an output line diagram as shown in FIG. 6, with a base rotational speed of nb, a maximum rotational speed of nt, and an output of p0, is to be satisfied, with the number of turns of the winding being 2 turns, although the voltage generated in the winding can be set within the allowable value for all rotational speed regions when the output of p0 is generated, the generated torque is small because of the small number of turns, the output of p0 cannot be generated at the rotational speed of nb, and the specification cannot be satisfied with 2 turns. On the other hand, if the number of turns is set to 3 turns, the generated torque is approximately 1.5 times that of the configuration with 2 turns, because the number of turns is 1.5 times that of the configuration with 2 turns, and the output of p0 can be generated at the rotational speed nb, but the voltage generated in the winding exceeds the allowable value when the output of p0 is to be generated at a rotational speed greater than a rotational speed nc. Therefore, as shown in FIG. 7, there is employed a configuration where the output is reduced from p0 at the rotational speed from nc to nt, in order to reduce the current to be applied, and to limit the voltage generated in the winding to a value within the allowable value.

In this manner, in the case where, for example, a configuration of 2 turns is not sufficient and a configuration of 3 turns results in an extra margin in order to generate the output of p0 at nb, and the configuration of 3 turns results in the voltage generated in the winding exceeding the allowable value with the rotational speed exceeding nc and the configuration of 2 turns results in an extra margin of the voltage generated in the winding with respect to the allowable value even if the output of p0 is generated to the maximum rotational speed nt, it can be expected, through calculation, that, with an intermediate number of rotations; for example, 2.5 turns at the midpoint between 2 and 3 turns, the voltage generated in the winding would be within the allowable value and the output would satisfy the specification. However, only an integer can be selected for the number of turns, and, thus, one of 2 turns and 3 turns must be selected. As a result, in many cases, a configuration of 3 turns is selected and the amount of application of current at a high rotational speed is reduced to intentionally reduce the output at the high rotational speed.

However, in this case, although the motor has a capability to satisfy the specification, the capability of the motor cannot be fully utilized due to limitation that the number of turns must be an integer.

SUMMARY

An advantage of the present invention is resolution of a problem that the output which can be generated by the motor cannot be generated because only an integer can be selected for the number of turns.

According to one aspect of the present invention, there is provided a motor comprising a stator in which a plurality of slots are formed, and a rotor. An overall parallel winding formed of three phases and having a total number of parallels p is wound in the plurality of slots of the stator. When m is a half of a number of slots of one phase of the plurality of slots of the stator and n is a divisor of m, the overall parallel winding of the total number of parallels p is equally divided n-fold into partial parallel windings Ni, where i is an integer from 1 to n, having a number of parallels p/n, each partial parallel winding Ni comprises m sub-coils, the m sub-coils including n types of m/n sub-coils of a number of turns tj where j is an integer from 1 to n, at least one of the sub-coils differing from the other sub-coils, and, for each pair of the slots in the stator, one sub-coil of each partial parallel winding Ni is wound around the pair of the slots, and n sub-coils wound around the pair of the slots include every one of the n types of the sub-coils of the number of turns tj.

Technical Advantage

With various aspects of the present invention, a fractional number can be selected for the number of turns of the motor, and, consequently, the capability of the motor can be fully utilized for the output.

DESCRIPTION OF EMBODIMENT

Figure 1:
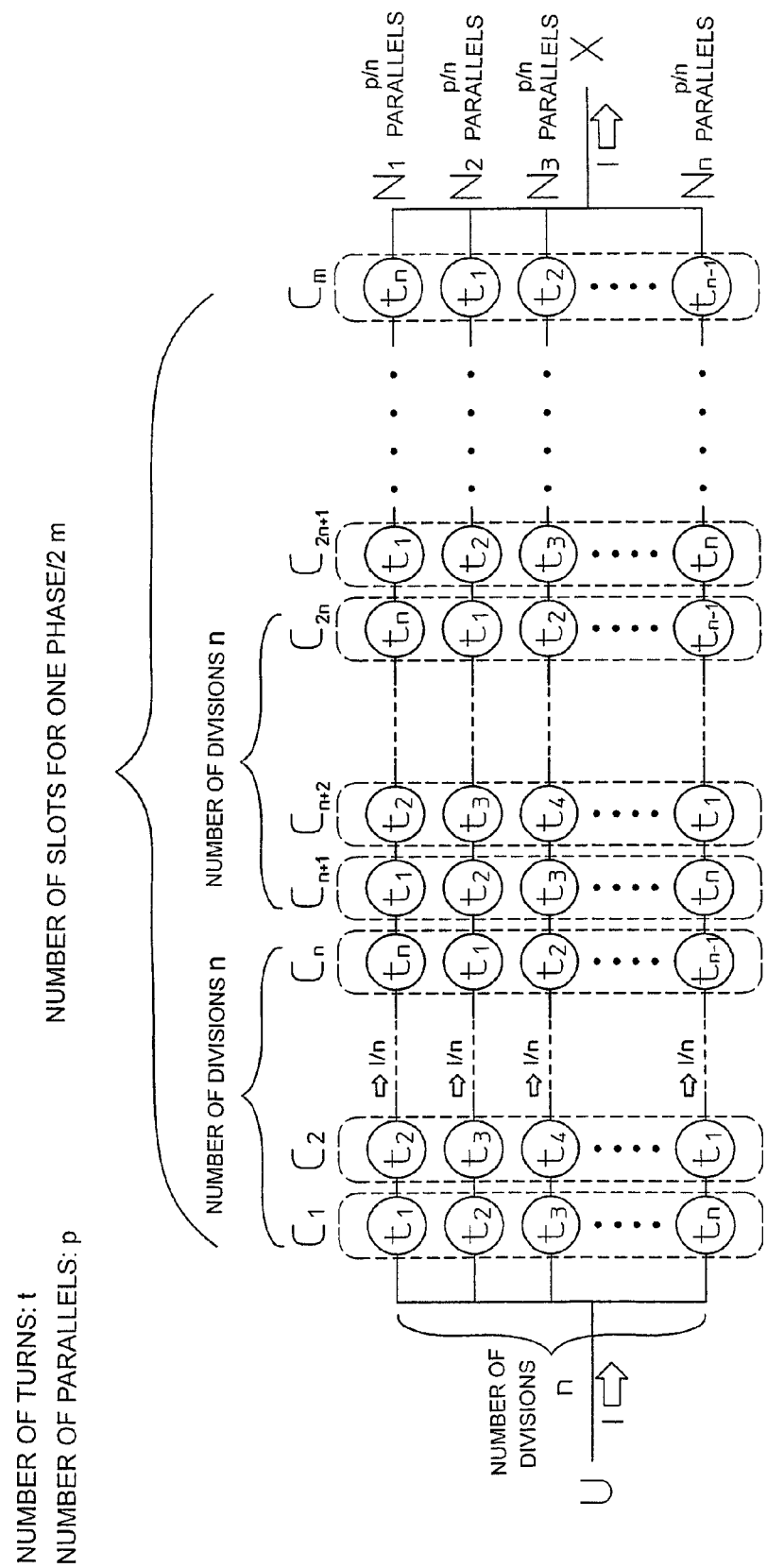
FIG. 1 is a diagram showing an example winding method of a winding according to the present invention.

FIG. 1 is a schematic diagram showing a structure of a winding method of a winding for a motor according to a preferred embodiment of the present invention. In FIG. 1, a winding of one phase is shown between a point shown by U and a point shown by X. FIG. 1 shows a winding of a number of turns t per slot and a number of parallels of p. This group of parallel windings of a total number of parallels p (hereinafter called "overall parallel winding") is divided into n groups of parallel windings (hereinafter called "partial parallel windings") as shown by N1, N2, . . . Nn. Each of the divided partial parallel windings N1, N2, . . . Nn comprises an equal number of windings (that is, p/n windings). In other words, all of the partial parallel windings N1, N2, . . . Nn are wound with p/n parallels. Here, p/n is the number of parallels (number of parallels of windings), and, thus, must be an integer. Therefore, n is selected from the divisors of p or p must be selected to be a multiple of n. In this selection, the line size of the winding is considered. In each of the partial parallel windings N1, N2, . . . Nn, coils of a number indicating half of the number of slots per phase (this number will hereinafter be referred to as "m") are connected in series. In the following, the coil which is formed by winding the individual partial parallel windings N1, N2, . . . Nn of the number of parallels of p/n around the slots of one pair is called a "sub-coil." Meanwhile, a combination of the sub-coils of the partial parallel windings N1, N2, . . . Nn which are wound around the same slot of one pair will be called simply a "coil." In FIG. 1, the "coils" are shown with C1, C2, . . . Cm. When individual coils C1, C2, . . . Cm do not need to be distinguished, the coils will be collectively described as a coil C. In FIG. 1, circles shown with reference numerals t1, t2, . . . tn represent sub-coils formed by winding each partial parallel winding N1, N2, . . . Nn for t1, t2, . . . tn times. The number of turns for each sub-coil is t1 turns, t2 turns, . . . tn turns. In the divided partial parallel windings N1, N2, . . . Nn, sub-coils of the number of turns of t1, t2, . . . tn exist, with the number of sub-coils being m/n (this is because the total number of sub-coils for all types of numbers of turns t1~tn for one parallel winding is m). Therefore, m/n must be an integer, and the number of divisions n is a number selected from the divisors of m. Thus, n and p are determined by selecting n from the divisors of the number m which is determined in advance for the motor (m=number of slots/2), and selecting p in relation to the line size of the winding such that p is a multiple of n.

With regard to the number of turns in the same coil, for example, in the coil C1, n types of sub-coils exist in parallel to each other in the order of t1 turns, t2 turns, . . . tn turns, and, in the coil C2, n types of sub-coils exist in the order of t2 turns, t3 turns, . . . tn turns, t1 turns. In this manner, in one coil, sub-coils of all numbers of turns from t1 turns to tn turns exist in parallel. Therefore, in the example configuration of FIG. 1, the placement of the numbers of turns is shifted by one in the order of N1, N2, . . . . Here, if a total number of turns t in one coil C is calculated, because n windings (sub-coils) having the number of turns of t1 turns, t2 turns, . . . tn turns exist in parallel to each other within the coil C, the total number of turns t is:

$$t = (t1 + t2 + \ldots + tn)/n \quad \text{(Equation 1)}$$

Here, t1, t2, . . . tn are integers. If the numbers of turns are summed for each partial parallel winding N1, N2, . . . Nn, the total number of turns is (t1+t2+ . . . +tn)×(m/n) for all of the partial parallel windings, and the number of parallels is p/n and is equal for all partial parallel windings. Therefore, the divided partial parallel windings N1, N2, . . . Nn have the same winding resistance. Therefore, if the current applied to the overall winding is I, each of the partial parallel windings N1, N2, . . . Nn is applied with equally divided current I/n. A sum AT of (ampere×turns) of the winding in each slot is:

$$AT = t1 \times I/n + t2 \times I/n + \ldots tn \times I/n \quad \text{(Equation 2)}$$
$$= (t1 + t2 + \ldots + tn) \times I/n$$

Because (t1+t2+ . . . tn)=t×n from Equation 1, Equation 2 can be simplified as:

$$AT = t \times I$$

Therefore, in each slot, AT is equivalent to a current I being applied to a winding of t turns. As shown in Equation 1, t is a number which is not limited to an integer and which can be a fraction. Therefore, the winding shown in FIG. 1 allows the number of turns to be a fractional number, rather than an integer.

Figure 2:
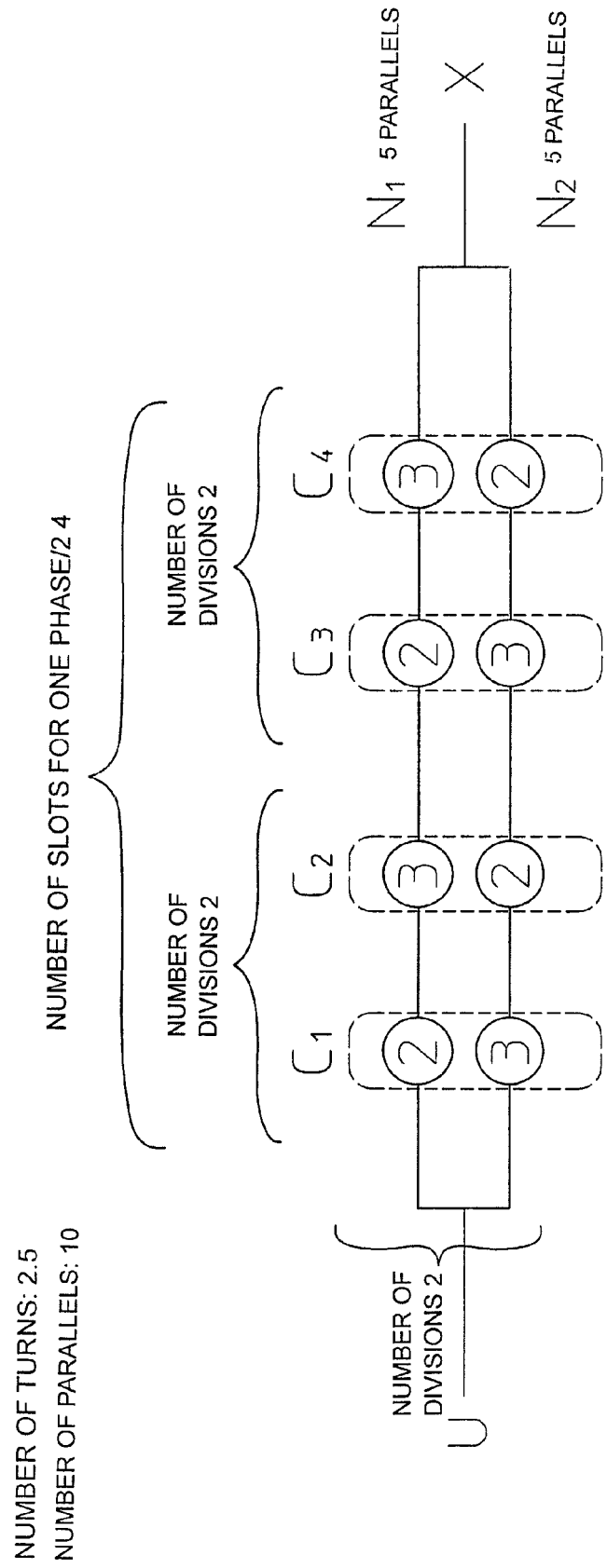
FIG. 2 is a diagram showing an example winding method of a winding according to the present invention.
Figure 3:
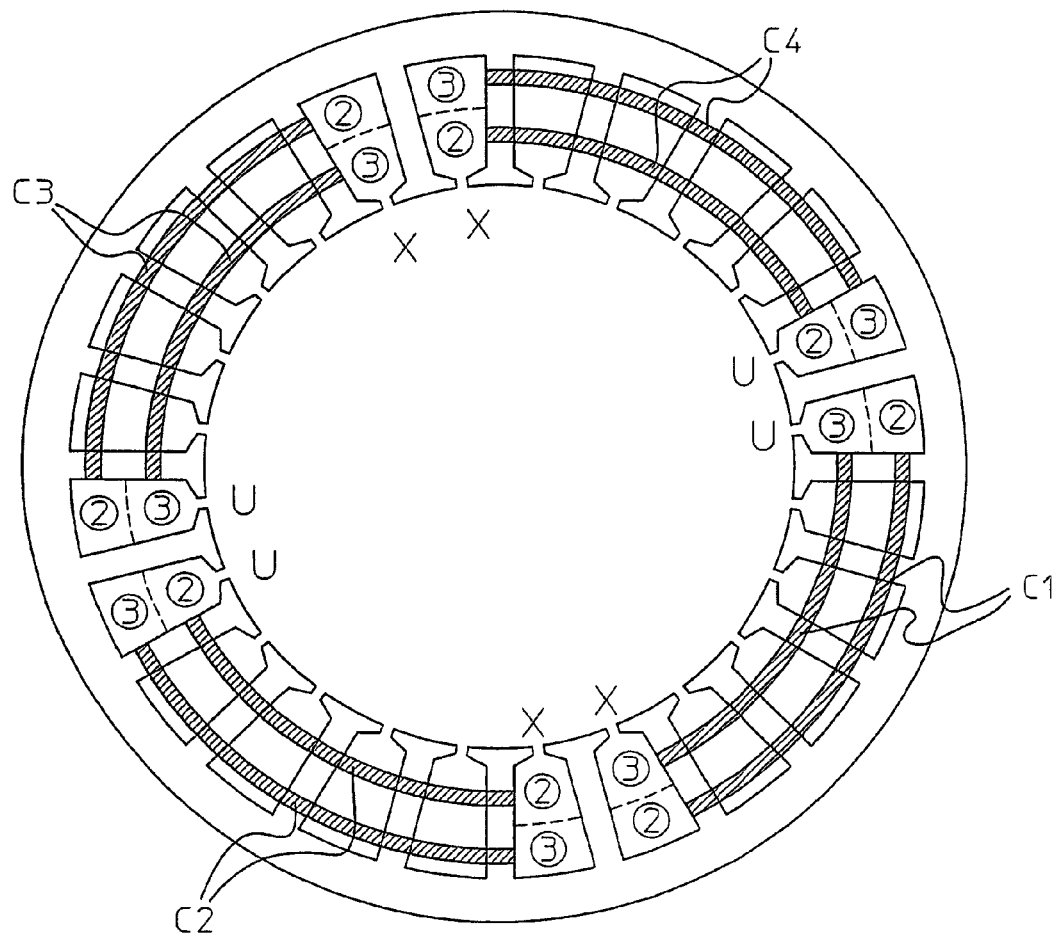
FIG. 3 is a diagram showing an example winding method of a winding in the present invention.
Figure 4:
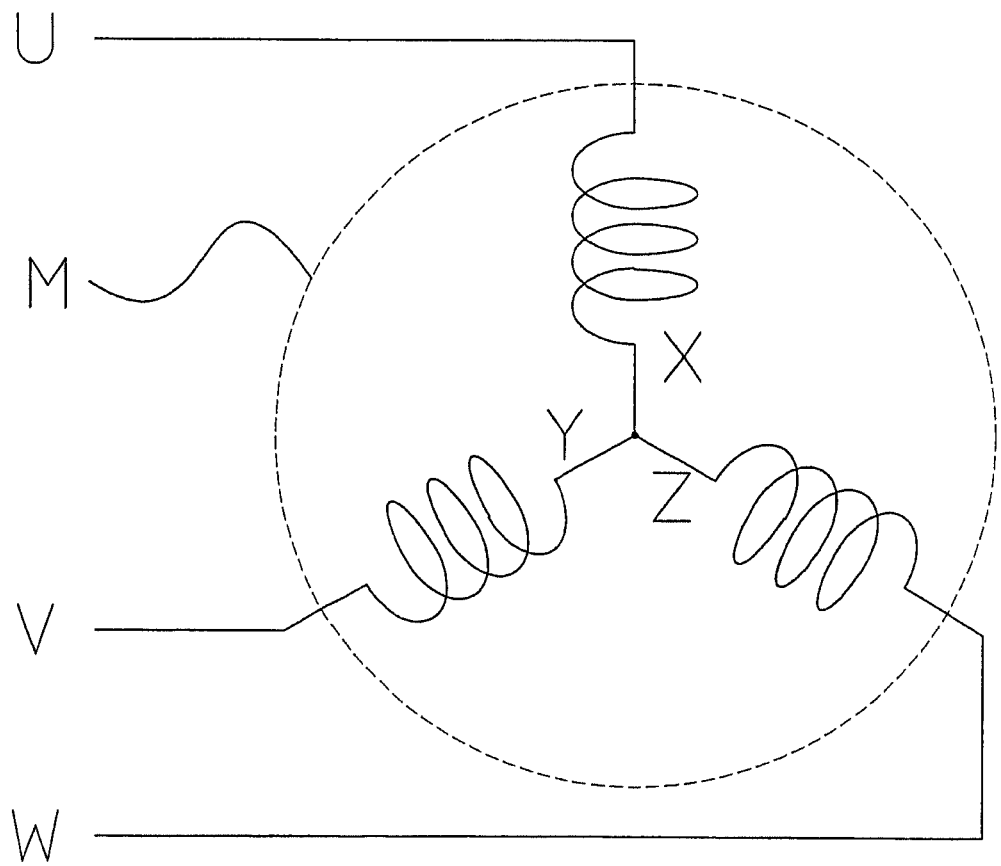
FIG. 4 is a diagram showing an example structure of a motor of the related art.
Figure 5:
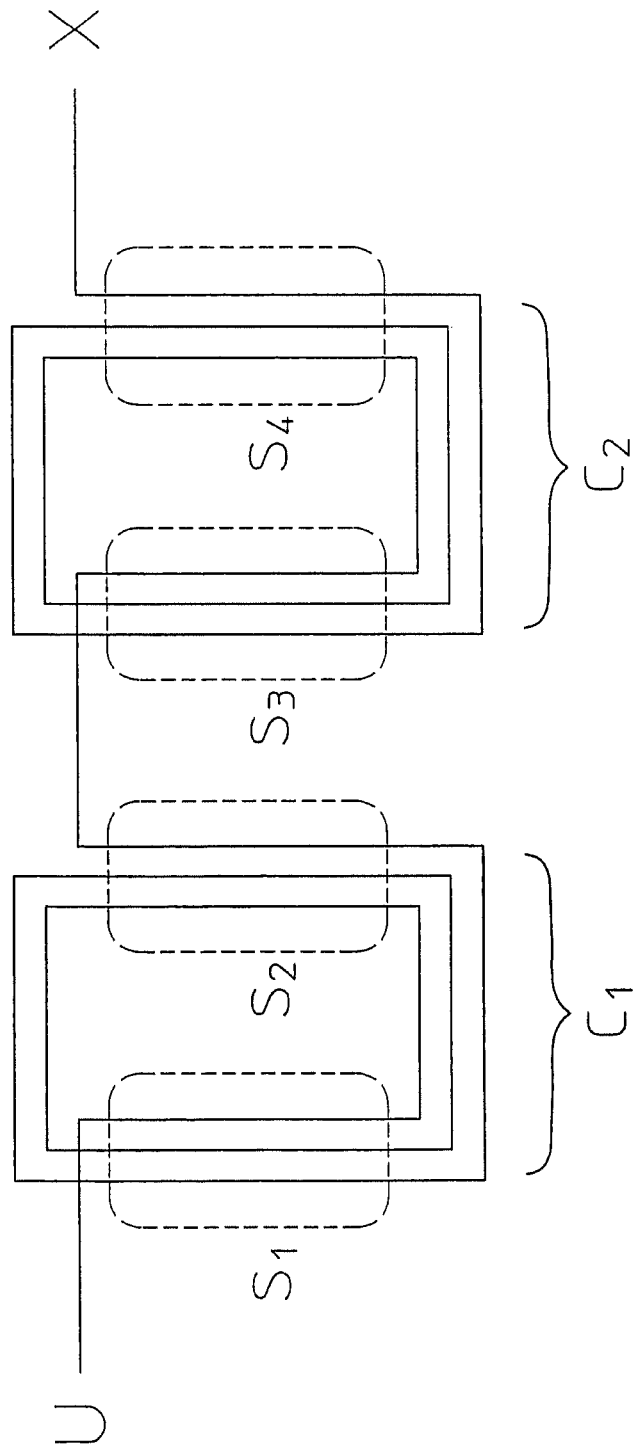
FIG. 5 is a diagram showing an example winding method of a winding of the related art.
Figure 6:
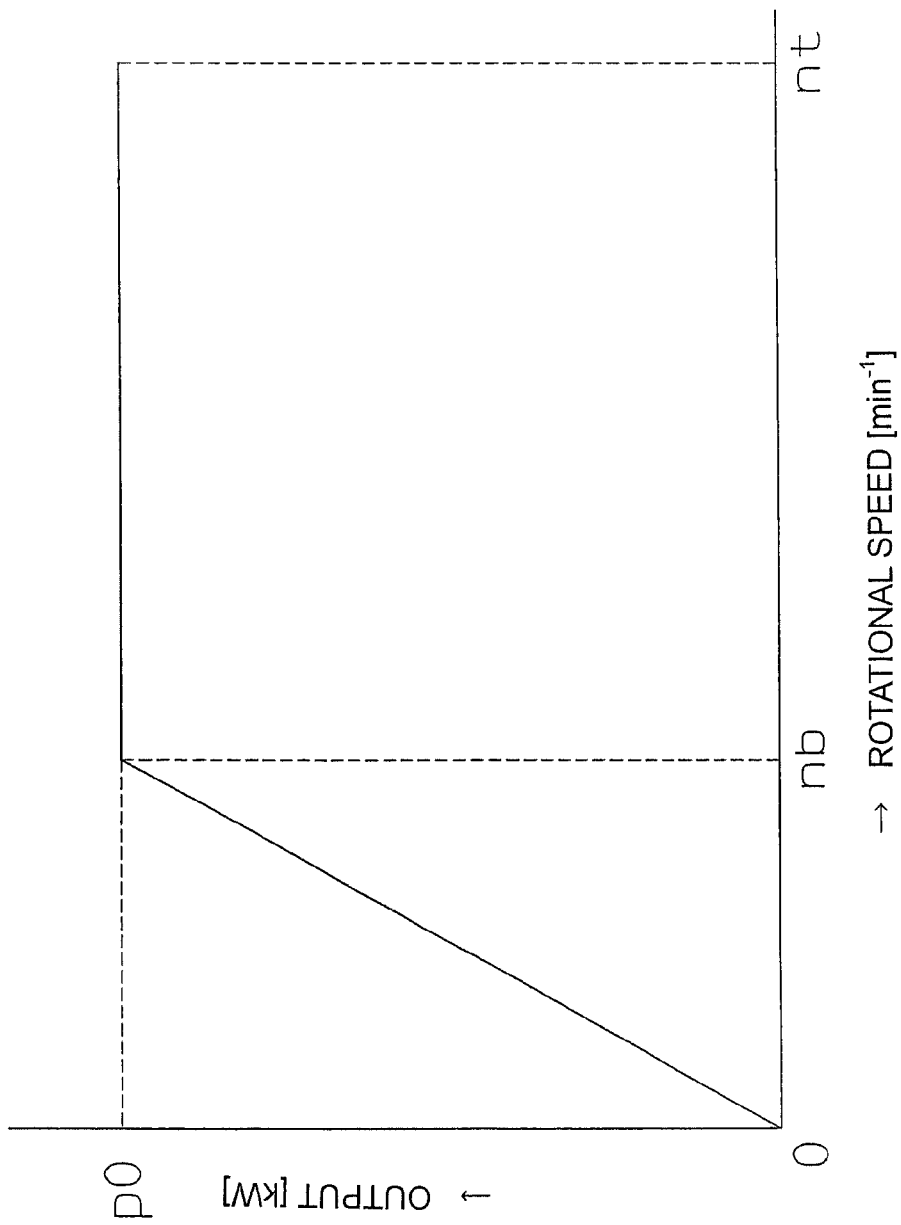
FIG. 6 is a diagram showing an example output of a motor of the related art.
Figure 7:
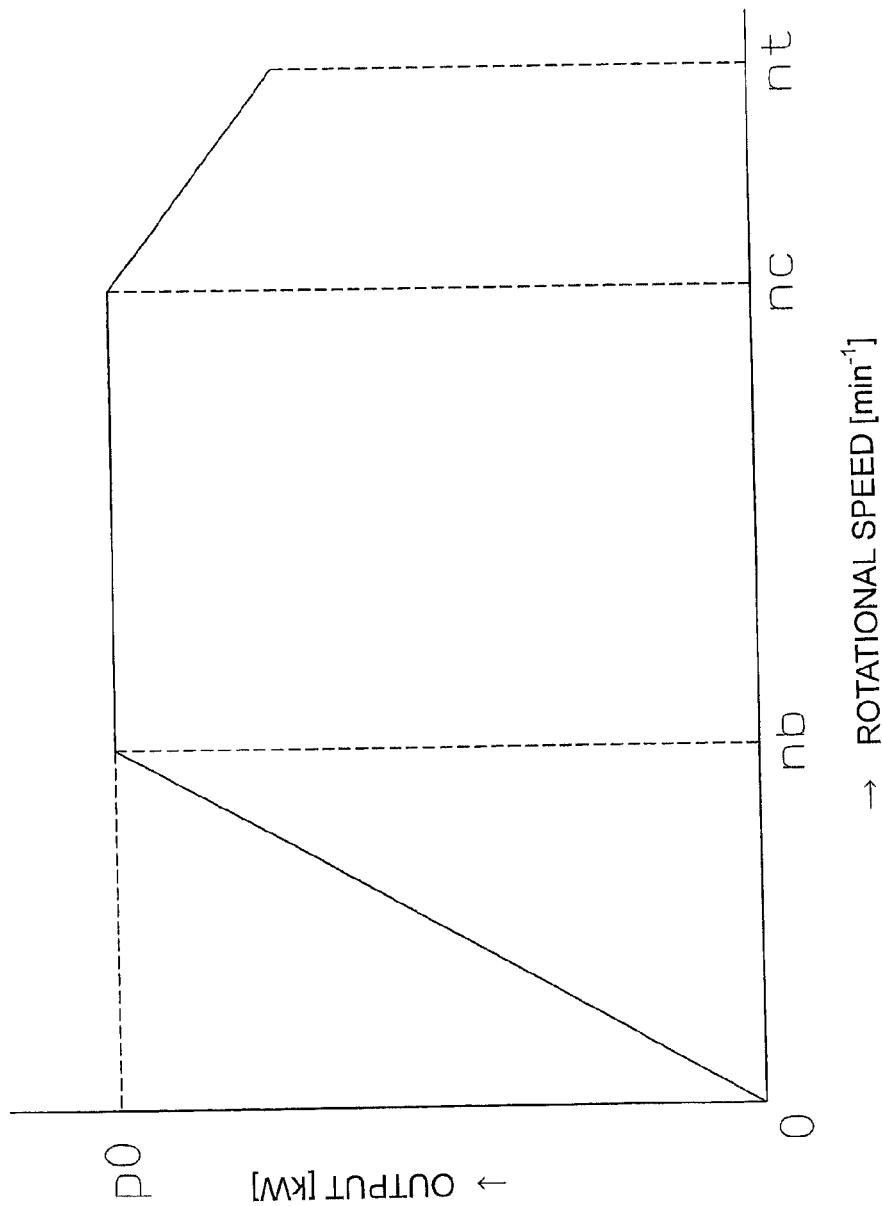
FIG. 7 is a diagram showing another example output of a motor of the related art.

In the following, a specific example using an actual numerical value will be described for facilitating understanding. For example, a case is considered in which a winding of t=2.5 turns is to be wound around a stator of 24 slots. The half of number of slots for each phase, m, =24 slots/3 phases/2=4. From the divisors of 4, 2 is selected as the number of divisions n. Because n=2, t1+t2=5 from Equation 1. t1 and t2 may be any integers that add to 5; for example, t1 is set to 2 and t2 is set to 3. The number of parallels p is selected from multiples of n, which is 2. Here, for example, p=10 is selected. In this case, when the above-described values are input to the parameters in FIG. 1, a winding method is employed as shown in FIG. 2 in which the total number of parallels p=10 is divided two-fold into partial parallel windings N1 and N2 each having 5 parallels, and sub-coils of 2 turns and 3 turns are alternately placed. In this case, the partial parallel windings N1 and N2 have a total number of 10 turns, and a number of parallels of 5 parallels. Therefore, the current I applied to the overall winding is divided into I/2 in N1 and N2. On the other hand, in each slot, because a current of 2×I/2+3×I/2=5/2×I ampere-turn is applied, the structure is equivalent to a winding of 5/2=2.5 turns. When the winding wound with this method is shown in the cross section of the stator, the placement of the slot is that shown in FIG. 3.

The above-described method is an example of the winding method of the winding of the motor in the present embodiment. In the above-described example configuration, a winding of 2.5 turns is wound with n=2. In the case where, for example, the number of turns is slightly insufficient with 2.5 turns, n may be set to 4, so that the overall parallel winding is divided by 4, and t1, t2, t3, and t4 may be set as t1=1, t2=2, t3=3, and t4=5, to achieve t=11/4=2.75 turns. In this manner, the numerical values for t1, t2, . . . tn can be freely selected so long as the number of divisions n is a divisor of m, and, therefore, the number of turns can be freely selected for a certain degree, including not only integers, but also fractions.

In the above-described preferred embodiment, as shown in FIG. 1, a configuration is employed in which the numbers of turns t1, t2, . . . tn are shifted by one in the order in the individual partial parallel windings N1, N2, . . . Nn and also in the individual coils C1, C2, . . . C2. However, this configuration is merely exemplary, and the order of placement of the numbers of turns t1, t2, . . . tn may be any order so long as the partial parallel windings N1, N2, . . . Nn include a total of m/n groups of t1, t2, . . . tn, and the coils C1, C2, . . . Cn include all of the number of turns t1, t2, . . . tn. In addition, as described previously, t1, t2, . . . tn may be any integer, and the same number may be included two or more times. It is sufficient that at least one of t1, t2, . . . tn differs from the other numbers.

What is claimed is:

1. A winding structure of a winding in a motor comprising a stator in which a plurality of slots are formed and a rotor, wherein
    an overall parallel winding formed of three phases and having a total number of parallels p is wound in the plurality of slots of the stator,
    when m is half of a number of slots of one phase of the plurality of slots of the stator and n is a divisor of m, the overall parallel winding of the total number of parallels p is equally divided n-fold into partial parallel windings Ni, where i is an integer from 1 to n, having a number of parallels p/n,
    each partial parallel winding Ni comprises m sub-coils, the m sub-coils including n types of m/n sub-coils of a number of turns tj where j is an integer from 1 to n, at least one of the sub-coils differing in number of turns from the other sub-coils, and
    for each pair of the slots in the stator, one sub-coil of each partial parallel winding Ni is wound around the pair of the slots, and n sub-coils wound around the pair of the slots include every one of the n types of the sub-coils of the number of turns tj.

2. The winding structure according to claim 1, wherein the numbers of turns t1, t2, . . . to are shifted by one in order in the individual partial parallel windings N1, N2, . . . Nn and also in the individual coils C1, C2, . . . Cn.

3. The winding structure according to claim 1, wherein the n types of the numbers of turns tj all have different values.

* * * * *